United States Patent Office 2,866,835
Patented Dec. 30, 1958

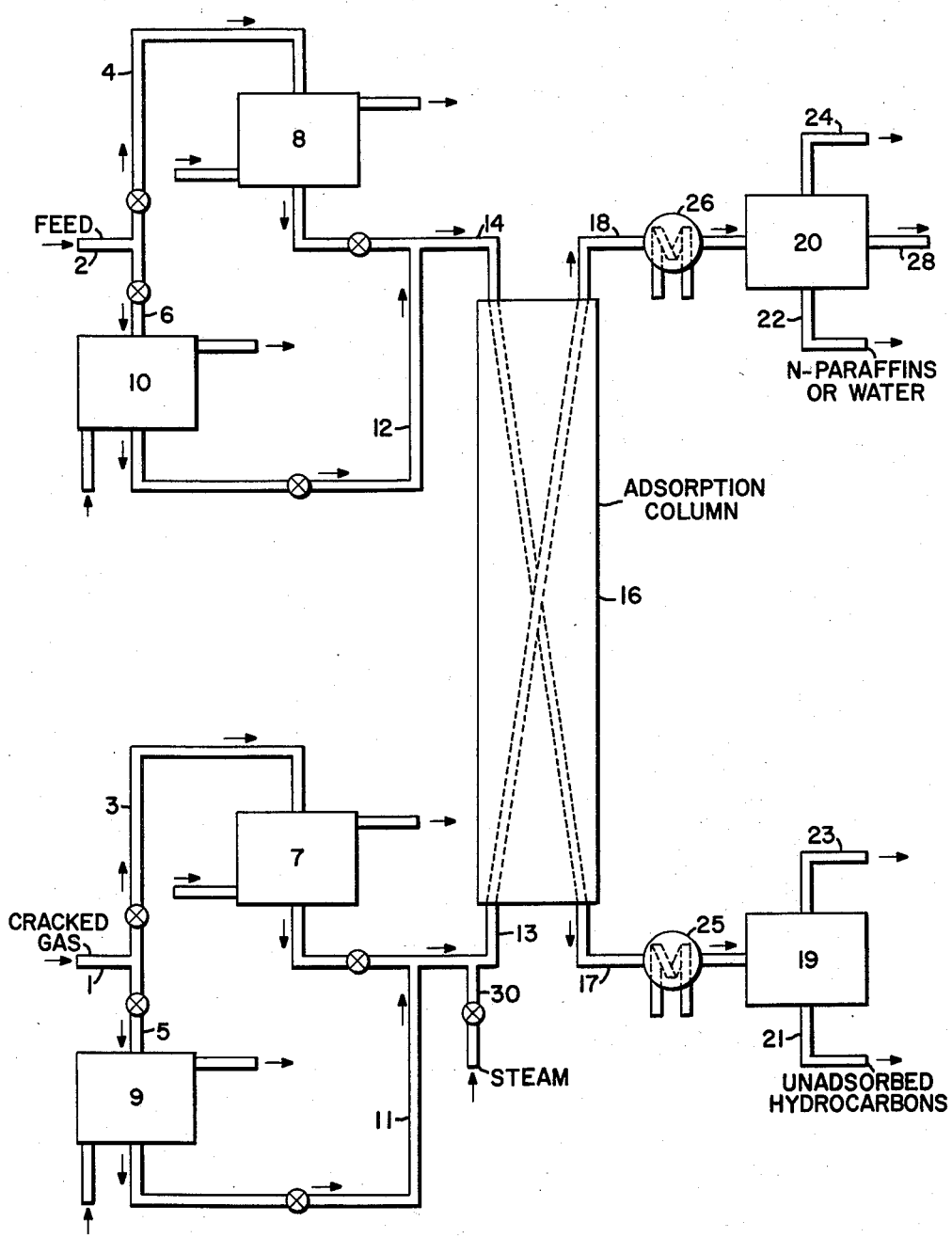

2,866,835

OLEFIN SEPARATION AND RECOVERY

Charles Newton Kimberlin, Jr., and William Judson Mattox, Baton Rouge, La., assignors to Esso Research and Engineering Company, a corporation of Delaware Application August 30, 1956, Serial No. 607,237

8 Claims. (Cl. 260—676)

The present invention relates to a process for separating olefins from hydrocarbon streams. More particularly, the present invention relates to the separation of straight chain hydrocarbons, both paraffinic and olefinic, from branch chain and cyclic hydrocarbons employing a class of natural or synthetic adsorbents, termed, because of their crystalline patterns with pore diameters of about 4.5 to 5.5 Angstrom units, molecular sieves. Still more particularly, the present invention relates to the separation of straight chain olefins from n-paraffins and the further resolution of the former into cis and trans isomers.

It has been known for some time that certain zeolites, both natural and synthetic, have the property of separating straight chain from branch chain hydrocarbon isomers, as well as from cyclic and aromatic compounds. These zeolites have innumerable pores of uniform size, and only molecules small enough to enter the pores can be adsorbed. The pores may vary in diameter from 3 or 4 Angstroms to 15 or more, but it is a property of these zeolites that any particular sieve has pores of a substantial uniform size. For separating n-hydrocarbons from their isomers, the pore size is about 5 Angstroms.

The scientific and patent literature contains numerous references to the sorbing action of natural and synthetic zeolites. Among the natural zeolites having this sieve property may be mentioned chabasites. A synthetic zeolite with molecular sieve properties is described in U. S. 2,442,191. Zeolites vary somewhat in composition, but generally contain the elements of silicon, aluminum and oxygen as well as an alkali and/or an alkaline earth element; e. g., sodium and/or calcium. The naturally occurring zeolite analcite, for instance, has the empirical formula $NaAlSi_2O_6 \cdot H_2O$. Barrer (U. S. 2,306,610) taught that all or part of the sodium is replaceable by calcium to yield, on dehydration, a molecular sieve having the formula $(Ca, Na_2)Al_2Si_4O_{12}$. Black (U. S. 2,522,426) describes a synthetic molecular sieve zeolite having the formula $4CaO \cdot Al_2O_3 \cdot 4SiO_2$. A large number of other naturally occurring zeolites having molecular sieve activity; i. e., the ability to adsorb a straight chain hydrocarbon and exclude the branch chain isomers due to differences in molecular size, are described in an article "Molecular Sieve Action of Solids," appearing in Quarterly Review, vol. III, pages 293–320 (1949), published by the Chemical Society (London). A particularly effective synthetic molecular sieve of high adsorptive capacity may be prepared by heating together sodium aluminate and sodium metasilicate at 180° to 200° F. under carefully controlled conditions to form a sieve having a pore diameter of about 4 Angstroms, and base exchanging the crystalline sodium aluminum silicate formed with calcium ion to form a sieve with pores of about 5 Angstroms diameter.

The segregation or removal of branched chain or straight chain isomers from hydrocarbon mixtures, either for the purpose of enriching the mixture in branched chain components or for isolating and recovering straight chain isomers has become increasingly important in industry with the growing realization that the activity, potency and desired physical property of a product may depend upon the specific structure of the various possible hydrocarbons utilizable as reactants in the preparation or manufacture of the final product. Thus in the preparation of high octane fuels, the presence of paraffinic straight chain hydrocarbons makes for a lower octane fuel. On the other hand, in the manufacture of synthetic detergents such as the alkyl aryl sulfonates, a straight chain nuclear alkyl substituent confers better detergency characteristics than a branched chain isomer. Numerous other examples might be cited.

It has, in the past, been proposed to make separation of straight chain from branch chain, cyclic and aromatic hydrocarbons by molecular sieves, and excellent and highly selective separations have been realized. However, these separation techniques have proved to be ineffective when applied to streams including both straight chain paraffins and straight chain olefins. Though sieves have preferred adsorption characteristics for highly polar molecules over non-polar ones in mixtures, they will not preferentially adsorb n-paraffins from a stream containing n-paraffins and n-olefins, particularly when the olefins have more than about 5 carbon atoms in the molecule. Consequently, the sieve, which has a pore size of about 5 Angstroms, will adsorb both the straight chain olefins and paraffins. Desorption techniques hitherto proposed and employed, such as steaming, purging with an inert gas such as nitrogen or methane, evacuation, or plain heating, will result in a desorbate consisting of both n-paraffins and n-olefins, and further separation steps will be required. It is therefore an important aspect of the present invention to set forth a method of separating n-olefins from n-paraffins, as well as from isoolefins and paraffins, cyclics and aromatics, using molecular sieves.

It is also a purpose of the present invention to set forth a method of separating cis olefins from trans olefins and segregating the respective materials. These geometrical isomers are useful as chemical intermediates and in purification and isolation of chemical compounds.

It is also a purpose of the present invention to provide desorption means which prolong substantially the life of the molecular sieve adsorbent.

It is a still further object of the present invention to desorb hydrocarbons from molecular sieves without employing unduly high temperatures.

It is a still further object of the present invention to provide a means of desorbing straight chain aliphatic and olefinic hydrocarbons from molecular sieves whereby improved hydrocarbon feed streams for petroleum refinery processes are obtained.

Other and further objects of the present invention will appear in the following more detailed description and claims.

These objects and advantages may be realized by employing a two-stage desorption and regeneration technique wherein, in the first stage, the adsorbed paraffin is selectively desorbed, and in the second stage, the trans n-olefin is recovered. More specifically, it has been found that excellent separations of trans n-olefins from n-paraffins may be realized by a combination process involving passing a hydrocarbon stream containing n-paraffins and normally liquid n-olefins through a bed of 5 Angstrom molecular sieve zeolite (a complex calcium-sodium-alumina silicate) until no more normal hydrocarbons are adsorbed. Thereafter, there is passed through the sieve under carefully controlled conditions a stream of low boiling olefins. Though ethylene, propylene, and n-butylene may be employed, propylene is preferred for desorbing n-paraffins boiling within the naphtha or gasoline boiling range. In a preferred embodiment, both adsorption of the mixed stream and selective desorption by the light olefins are carried out in the vapor phase, and both cycles at substantially the same temperatures.

The relationship between the olefin desorbent, the n-paraffin desorbed, and preferred desorbing temperatures are shown in the table below:

| Desorbing olefin | Adsorbed n-Paraffin | Desorbing Temperature, °F. |
|---|---|---|
| $C_2$ | $C_2$-$C_5$ | 0-100 |
| $C_3$ | $C_5$-$C_9$ | 100-300 |
| n-$C_4$ | $C_7$-$C_{12}$ | 300-450 |

The normally liquid n-olefins adapted for separation from n-paraffins by this process are not substantially desorbed by the normally gaseous olefins. They may, however, be readily recovered by the more conventional desorption techniques enumerated previously, such as steaming, evacuation, inert gas purging or the like.

It has further been found that the cis olefins in the original stream are not significantly adsorbed by the sieve, while the sieve adsorbate olefins are substantially completely of the trans type. The process of the present invention thus affords a ready tool in making this important separation.

In one embodiment of the invention, a mixed branched-chain/straight chain material containing olefins and paraffins such as a light catalytic naphtha, boiling in the $C_6$—200° F. range may be passed through a bed of molecular sieves, having pores of 5 Angstroms till normal paraffins appear in the effluent. Thereupon, without changing the temperature of the molecular sieve bed, an olefin-containing gas stream, preferably containing propylene, is passed through the bed till the paraffin has been substantially displaced. Thereafter, the olefins are displaced with steam, ammonia, or other purge gas, and the cycle is repeated.

The process of the present invention may be understood more clearly when read in conjunction with the drawings.

Turning now to the figure, there is shown an adsorption column 16, provided with suitable heating means (not shown) and containing the molecular sieve adsorbent. The size of the pore diameter depends upon the molecular size of the material to be separated. It must be large enough to adsorb the straight chain but not large enough to adsorb the branched chain isomers. The adsorptive capacity and pore size of the sieve, and the structure of the hydrocarbon are related in the following manner:

| Adsorbed on 4 A. and 5 A. | Adsorbed on 5 A. but not 4 A. | Not Adsorbed on 4 A. or 5 A. |
|---|---|---|
| (1) Ethane. (2) Ethylene. (3) Propylene. | (1) Propane and higher n-paraffins. (2) Butene and higher n-olefins. | (1) Iso-paraffins. (2) Iso-olefins. (3) Aromatics. (4) All cyclics with 4 or more atoms in ring. |

A motor fuel prepared by catalytic cracking a hydrocarbon fraction and boiling in the range of about 85° to 425° F., and containing substantial amounts of normal and isoolefins as well as normal and isoparaffins is employed as feed in one embodiment of the invention. A feed of this type, which may contain small amounts of moisture or sulfur compounds, is introduced into the adsorption system through line 2, and may be passed, if desired, through preliminary feed purification zones 8 or 10. The feed may be preheated to a temperature of 200° to 400° F. Zones 8 and 10 contain a molecular sieve or similar material having a pore size equal to or smaller than the straight chain paraffin to be adsorbed in tower 16; it may be 4 to 5 Angstroms or less. It has been found that the capacity of sieves to adsorb hydrocarbons is greatly reduced if water is present, even in small quantities, since it is more strongly adsorbed than most hydrocarbons. Certain sulfur compounds are also selectively adsorbed and difficult to desorb. Since most hydrocarbon streams available in a refinery contain small amounts of these impurities, the continued use of the sieves in such separation operations would necessitate periodic interruptions to desorb the contaminants and restore adsorbent capacity. With the use of the guard zone, the contaminants are removed but appreciable amounts of hydrocarbons are not adsorbed. Since the capacity of the 4 and 5 Angstroms and smaller sieves for water is high, the volume of this adsorbent with respect to that in zone 16 is small. In the drawing, two such water adsorption systems are employed in drying and regeneration cycles so as to make the hydrocarbon separation continuous. Each of the systems in turn may comprise two alternate zones, the feed being switched from 8 to 10 when zone 8 requires regeneration. The latter is accomplished by sweeping out the water with hot gases such as air. It is understood, however, that a dry feed, or one that is substantially sulfur-free, does not require this purification treatment.

The hydrocarbon feed, containing n- and iso-paraffins and n- and iso-olefins, is now passed, preferably in the vapor phase at a temperature of about 200° to 400° F. into adsorption tower 16. The adsorbent, which may be any natural or synthetic zeolite of the molecular sieve type heretofore described, may be arranged in trays, or packed on supports or be unsupported. Reaction conditions within adsorber are flow rates of 0.1 to 5 v./v./hr., temperatures of 175° to 400° F., and pressures of atmospheric to about 400 p. s. i. g.

The naphtha now substantially free of straight chain paraffins and straight chain trans olefins is withdrawn from tower 16 and passed via line 17 and cooler 25 to accumulator 19, from where it may be withdrawn through line 21 for blending or for direct employment as a high octane motor fuel.

When the sieve becomes saturated with trans n-olefins and n-paraffins, as determined by conventional means such as refractive index, gravity or spectrographic analysis of the effluent, the flow of hydrocarbon feed through line 2 is halted and the first stage portion of the desorption cycle begins. An olefin-containing gas, preferably one comprising a substantial proportion of propylene, and preheated to 200° to 400° F. is passed through line 1, dried if desired in purifiers 7 or 9 containing the same or similar sieve type as in zones 8 and 10, and passed into tower 16. Cracked refinery gases may be used for this purpose. Without changing the temperature of the tower 16, the desorbing gas selectively replaces the paraffins adsorbed on the sieves with the olefins. The desorbed n-paraffins are withdrawn through line 18, cooled in cooler 26, and passed to accumulator-separator 20, and the n-paraffins withdrawn through line 22 for further processing, such as aromatization, reforming, isomerization and the like.

Steam at a temperature of 220° to 350° F. is now passed at atmospheric pressure into adsorption column 16 via line 30 in amounts sufficient to remove adsorbed olefins. The steam required will usually be within the approximate range of 7 to 9 pounds per gallon of $C_6$ to $C_8$ desorbate. Some variation in the steam requirements may be necessary for higher or lower molecular weight hydrocarbons.

The stream of steam and desorbed olefins, which comprises essentially the trans n-olefins contained in the original feed as well as adsorbed propylene purge gas, is in turn withdrawn through line 18 and cooled in cooler 26 and passed to accumulator 20. The olefin purge gas is readily removed as an overhead stream by distillation or flashing through line 24 and is recycled, after compression, if necessary, to the process. The liquid trans olefin is separated from the water layer in zone 20 and is passed via line 28 for further processing or for use in a manner known per se. Water is withdrawn through line 22 and may be discarded.

At the end of the second stage of the desorption cycle, when no more olefins are desorbed, as may readily be determined by examining the effluent, the adsorption cycle is resumed after the sieve has been reactivated by dehydration. This dehydration is accomplished by conventional means such as purging with relatively dry gas at temperatures of about 500° to 800° F.

The process of the present invention may be further illustrated by the specific examples below:

Example 1

A $C_6$ to $C_7$ olefinic fraction separated from a light catalytic naphtha and containing 4% of n-olefins and 6% of n-paraffins was vaporized and passed over a molecular sieve having pore openings of about 5 Angstroms at 240° F. to adsorb these straight chain compounds. Propylene was then passed over the sieve at the same temperature to preferentially displace the adsorbed paraffins. This propylene-displaced fraction amounted to 5.1% (on $C_6$ to $C_7$ feed) and consisted primarily of n-hexane and n-heptane with minor amounts of olefins. Steam desorption of the remaining adsorbed n-$C_6$ to $C_7$ olefins yielded 4.1% of a fraction containing 55% of n-olefins. Thus, an n-olefinic concentrate was produced by molecular sieve treating a cracked naphtha fraction which contained only 4% of n-olefins. Steam desorption without intermediate displacement of paraffins with propylene yielded a fraction containing only 38% n-olefins. The concentration of n-olefins in the desorbate can be further increased by increasing the severity of the intermediate n-paraffin displacement by lower boiling olefins. Infra-red examination of the above olefin concentrate showed:

(1) All olefins straight chain.

(2) Type II-trans olefins most abundant (R—CH=CH—R)

(3) Type I olefins next most abundant (R—CH=CH$_2$)

By using feed stocks of a more narrow boiling range, recycle of cuts of lower olefin content, etc., fractions of even higher olefin content may be obtained.

Example 2

A $C_6$ to $C_7$ straight chain olefin concentrate containing 40% olefins (in n-paraffins) was recovered in 10% yield from a light (110° to 235° F.) catalytic naphtha fraction by adsorption on a sieve having pore openings of about 5 Angstroms. The light naphtha feed contained cis and trans type olefins as well as various branched chain olefins and paraffins. Infra-red analysis of the olefins recovered from the molecular sieve by desorption showed the absence of branched chain olefins; trans type II olefins (R—CH=CH—R) predominated with minor amounts of type I olefins (R—CH=CH$_2$).

Example 3

A $C_7$ olefinic fraction from a light catalytic naphtha was treated at 240° F. as in Example 1 with a molecular sieve having 5 Angstrom pore openings. The steam desorbed olefin fraction contained 68% n-heptane.

Example 4

A mixture of approximately 20% cis—80% trans pentene-2 was contacted at 240° F. with a molecular sieve having an average pore opening of 5 Angstroms. The unadsorbed cis isomer (refractive index 1.3800; literature value 1.3798 at 25° C.) was obtained in 18% yield and the adsorbed trans isomer in 82% yield (by steam desorption) (refractive index 1.3759; literature value 1.3761 at 25° C.). The recovery of unadsorbed cis isomer also indicates that no substantial cis-trans isomerization takes place under these conditions.

The process of the present invention may be modified in many respects and still be within the scope thereof. The butenes may also be employed advantageously as desorbing agents as well as propylene, particularly, for higher molecular weight paraffins. The separations may be employed for substantially any feed containing n-paraffins and olefins, the sieve pore diameter being chosen in accordance with the molecular size. Though a fixed bed operation has been described, the separation cycles may also be carried out by means of a moving bed or the so-called fluidized solids technique in fluidized beds. The process of the present invention is particularly adapted to be employed in association with various means for upgrading virgin naphthas to form high octane motor fuels. The process is advantageously employed in connection with a fluid or fixed bed reforming operation wherein naphthas are treated at elevated temperatures and pressures in the presence of a catalyst containing platinum, molybdena, chromia, etc., under conditions to convert a substantial portion of the hydrocarbons present to aromatics. The resulting reformate is then enhanced in octane value by removal of n-paraffins and n-olefins by the sieves. The adsorbate may then be recovered in accordance with the process of the present invention and recycled to the hydroformer for further conversion. Furthermore, instead of steam desorption, olefins may be desorbed by purging at elevated temperatures or evacuation at lower temperatures.

What is claimed is:

1. An improved process for separating straight chain olefins from straight chain paraffins which comprises passing a vaporized stream of hydrocarbons comprising n-paraffins and n-olefins into a molecular sieve zeolite adsorption zone, maintaining a temperature of from about 175° to 450° F. in said zone, withdrawing unadsorbed hydrocarbons including cis n-olefins while adsorbing n-paraffins and trans n-olefins, passing a normally gaseous olefin comprising stream into said zone whereby n-paraffins are desorbed and said last-named olefins adsorbed, segregating said desorbed paraffins, thereafter purging said adsorption zone, and withdrawing a stream comprising normally gaseous olefins and trans n-olefins adsorbed from said first named stream.

2. The process of claim 1 wherein said initial vaporized stream is a naphtha fraction boiling in the gasoline range.

3. The process of claim 1 wherein said normally gaseous olefin is a propylene comprising gas.

4. The process of claim 1 wherein said adsorption zone containing adsorbed trans n-olefins and gaseous olefins is purged with steam, and said gaseous olefins flashed from said trans n-olefin.

5. An improved process for obtaining concentrates of trans n-olefins having more than about 5 carbon atoms which comprises passing a naphtha fraction boiling in the range of about 85° to 450° F., and comprising straight and branch chain paraffins and straight chain olefins into a molecular sieve zeolite adsorption zone, maintaining a temperature of about 175° to 400° F. and a pressure of about 15 to 400 p. s. i. g. in said zone, withdrawing unadsorbed isoparaffins and cis n-olefins from said zone while adsorbing straight chain paraffins and trans n-olefins, thereafter passing a propylene comprising gas into said zone whereby normal paraffins are desorbed and said propylene adsorbed, maintaining substantially similar temperatures and pressures during said adsorption and desorption stages, withdrawing said desorbed normal paraffins, purging said zone of adsorbed propylene and trans n-olefins, segregating a stream of said trans n-olefins and propylene, flashing off said propylene to recover a trans n-olefin rich concentrate, and thereafter again passing said first named vaporized naphtha into said zone.

6. The process of claim 5 wherein said purging is carried out with steam at about 220° to 350° F.

7. The process of claim 5 wherein said purging is carried out with an inert gas.

8. The process of claim 5 wherein said purging is carried out by evacuation.

References Cited in the file of this patent

UNITED STATES PATENTS

| | | |
|---|---|---|
| 2,306,610 | Barrer | Dec. 29, 1942 |
| 2,425,535 | Hibshman | Aug. 12, 1947 |
| 2,554,908 | Hirscher | May 29, 1951 |
| 2,666,500 | Cahn et al. | Jan. 19, 1954 |
| 2,776,250 | Capell et al. | Jan. 1, 1957 |